United States Patent [19]
Satoh

[11] Patent Number: 5,974,479
[45] Date of Patent: Oct. 26, 1999

[54] SYSTEM FOR EXECUTING, CANCELING, OR SUSPENDING A DMA TRANSFER BASED UPON INTERNAL PRIORITY COMPARISON BETWEEN A DMA TRANSFER AND AN INTERRUPT REQUEST

[75] Inventor: Kohtaroh Satoh, Tokyo, Japan

[73] Assignee: NEC Corporation, Tokyo, Japan

[21] Appl. No.: 08/908,978

[22] Filed: Aug. 8, 1997

[30] Foreign Application Priority Data

Aug. 16, 1996 [JP] Japan ................................. 8-234742

[51] Int. Cl.⁶ ............................................. G06F 13/30
[52] U.S. Cl. .............................. 710/25; 710/22; 710/36; 710/40
[58] Field of Search .................... 395/733, 737, 395/842, 670; 709/1; 710/22, 260, 264

[56] References Cited

U.S. PATENT DOCUMENTS

| | | | |
|---|---|---|---|
| 3,421,150 | 1/1969 | Quosig et al. | 395/737 |
| 5,493,646 | 2/1996 | Guttag et al. | 345/525 |
| 5,619,726 | 4/1997 | Seconi et al. | 395/842 |
| 5,664,200 | 9/1997 | Barlow et al. | 395/741 |
| 5,666,364 | 9/1997 | Pierce et al. | 370/455 |

FOREIGN PATENT DOCUMENTS

| | | |
|---|---|---|
| 60-118963 | 6/1985 | Japan . |
| 360246463 | 12/1985 | Japan . |
| 3-152648 | 6/1991 | Japan . |
| 5-151143 | 6/1993 | Japan . |

OTHER PUBLICATIONS

Translation of Japanese Patent Office Office Action dated Sep. 8, 1998.

*Primary Examiner*—Thomas C. Lee
*Assistant Examiner*—Chien Yuan
*Attorney, Agent, or Firm*—Whitham, Curtis & Whitham

[57] ABSTRACT

A data processing device having a DMA function for controlling DMA transfer, comprises a DMA unit, a CPU, a bus arbitration unit for controlling bus-using right of the DMA unit or the CPU, and an interruption controller for supplying an interruption request signal. The DMA unit includes a register, a comparator for making a comparison between a priority of a DMA transfer and a priority set on an interruption request, and a sequencer for deciding whether the DMA transfer is to be executed, canceled, or suspended in the operation state of a DMA unit according to the comparison result of the comparator.

16 Claims, 6 Drawing Sheets

SYSTEM FOR EXECUTING, CANCELING, OR SUSPENDING A DMA TRANSFER BASED UPON INTERNAL PRIORITY COMPARISON BETWEEN A DMA TRANSFER AND AN INTERRUPT REQUEST

BACKGROUND OF THE INVENTION

1. Field of the Invention

The present invention relates to a data processing device having a DMA (Direct Memory Access) function, and more particularly to a data processing device having a DMA function which is characterized by the interruption processing of a higher-priority interruption request issued during the DMA transfer.

2. Description of the Related Art

In a data processing device having a DMA function, if an interruption request is issued during the DMA transfer, higher-priority interruption processing may be queued until the DMA transfer has been completed, or the DMA transfer may be stopped in order to execute lower-priority interruption processing in some cases. In order to avoid this inconvenience, there has been proposed a data processing technique in the conventional data processing device, in which, with priority established in an interruption request and DMA transfer, the DMA transfer is temporarily halted only in case of priority given to the interruption request over the DMA transfer and the halt of the DMA transfer is released after the interruption processing has been completed.

Figure 6:
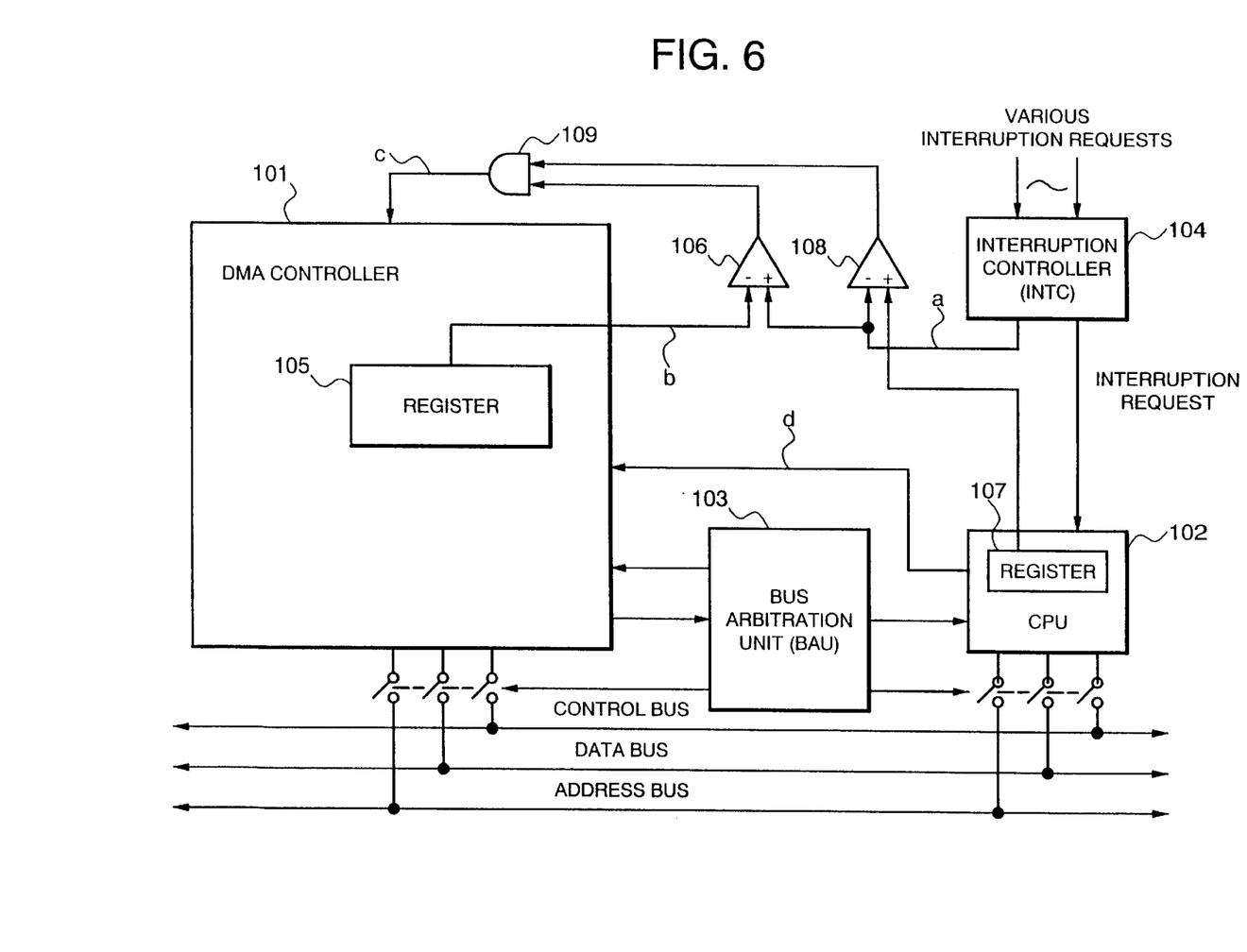
FIG. 6 is a block diagram showing the constitution of the conventional data processing device.

This kind of the conventional data processing technique is disclosed in, for example, Japanese Patent Publication Laid-Open (Kokai) No. Heisei 5-151143, "An Interruption Processing Method of a computer with a built-in DMA controller". This publication discloses an interruption processing method in which the interruption processing is executed with higher-priority than the DMA transfer only when a higher-priority interruption request than the DMA transfer is issued during the DMA transfer. FIG. 6 is a block diagram showing the constitution of a data processing device for realizing the interruption processing method of this publication.

As illustrated in FIG. 6, the data processing device disclosed in Japanese Patent Publication Laid-Open (Kokai) No. Heisei 5-151143 comprises a DMA controller 101, a CPU 102, a bus arbitration unit (BAU) 103, an interruption controller 104, a comparator 106 for making a comparison between the priority put on an interruption request and the priority established in a register 105 of the DMA controller 101, and a comparator 108 for making a comparison between the priority put on an interruption request and the priority established in a register 107 of the CPU 102. When the priority "a" of an interruption request supplied from the interruption controller 104 is higher than the priority "b" of the DMA controller 101, a signal "c" for temporarily halting the DMA transfer is supplied and the bus-using right is returned to the CPU 102, to thereby execute the interruption processing by priority. Thereafter, a DMA halt releasing signal "d" is supplied from the CPU 102 at the termination of the interruption processing, to resume the DMA transfer.

The above-mentioned conventional data processing device having a DMA function takes much time to stop the DMA transfer disadvantageously when a higher-priority interruption request than the DMA transfer is issued and the DMA transfer is not temporarily halted but canceled, in other words, when the state of a sequencer for the DMA transfer control is returned to the reset state and the bus-using right is abandoned. This is why predetermined processing such as to initialize the DMA controller is necessary in case of stopping the DMA transfer, and why the execution program of interruption processing must include a program for executing the predetermined processing.

SUMMARY OF THE INVENTION

An object of the present invention is to provide a data processing device capable of shortening the processing time for stopping the DMA transfer, by stopping the DMA transfer according to the control of hardware, even in case of stopping the DMA transfer because of a higher-priority interruption request signal being issued.

Another object of the present invention is to provide a data processing device capable of decreasing the size of the control program of a data processing device by stopping the DMA transfer according to other means than software.

According to one aspect of the invention, a data processing device having a DMA function for controlling DMA transfer, comprising a DMA unit, a CPU, a bus arbitration unit for controlling bus-using right of the DMA unit or the CPU, and an interruption controller for supplying an interruption request signal, the data processing device wherein the DMA unit comprises priority comparison means for making a comparison between the priority set on the DMA unit and the priority set on the interruption request; and a DMA transfer control means for deciding the DMA transfer to be executed, canceled, or suspended in the operation state of the DMA unit according to the comparison result of the priority comparison means.

The DMA transfer control means may stop DMA transfer, so to return the DMA unit to the initial state when the priority of the interruption request occurring during the DMA transfer is higher than the priority of the DMA unit, suspend DMA transfer when the priority of the interruption request occurring during the DMA transfer is equal to the priority of the DMA unit and resumes the DMA transfer after completion of the interruption processing by the interruption request, and continue DMA transfer when the priority of the interruption request occurring during the DMA transfer is lower than the priority of the DMA unit.

The DMA transfer control means, upon receipt of an asynchronous input signal of ICE chip interruption request from external during DMA transfer, may stops the DMA transfer, so to return the DMA unit to the initial state.

The DMA transfer control means may stop DMA transfer, so to return the DMA unit to the initial state when the priority of the interruption request occurring during the DMA transfer is higher than the priority of the DMA unit, suspend DMA transfer when the priority of the interruption request occurring during the DMA transfer is equal to the priority of the DMA unit and resumes the DMA transfer after completion of the interruption processing by the interruption request, continue DMA transfer when the priority of the interruption request occurring during the DMA transfer is lower than the priority of the DMA unit, and upon receipt of an asynchronous input signal of ICE chip interruption request from external during DMA transfer, stop the DMA transfer, so to return the DMA unit to the initial state.

In the preferred construction, the priority comparison means may include a register for setting the priority of the DMA unit, and a comparator for receiving an output signal of the register and an interruption request level signal showing the priority of the interruption request to make a comparison of the priority therebetween, while the DMA transfer control means is a sequencer for deciding the status on the basis of the output signal of the comparator.

In the preferred construction, the priority comparison means includes a register for setting the priority of the DMA unit, and a comparator for receiving an output signal of the register and an interruption request level signal showing the priority of the interruption request to make a comparison of the priority therebetween, while the DMA transfer control means is a sequencer for deciding the status on the basis of the output signal of the comparator, the sequencer may stop DMA transfer, so to return the DMA unit to the initial state when the priority of the interruption request occurring during the DMA transfer is higher than the priority of the DMA unit, suspend DMA transfer when the priority of the interruption request occurring during the DMA transfer is equal to the priority of the DMA unit and then resuming the DMA transfer after completion of the interruption processing by the interruption request, and continue DMA transfer when the priority of the interruption request occurring during the DMA transfer is lower than the priority of the DMA unit.

In another preferred construction, the priority comparison means may include a register for setting the priority of the DMA unit, and a comparator for receiving an output signal of the register and an interruption request level signal showing the priority of the interruption request to make a comparison of the priority therebetween, while the DMA transfer control means is a sequencer for deciding the status on the basis of the output signal of the comparator, the sequencer stopping DMA transfer, so to return the DMA unit to the initial state upon receipt of an asynchronous input signal of ICE chip interruption request from external during the DMA transfer.

In another preferred construction, the priority comparison means may include a register for setting the priority of the DMA unit, and a comparator for receiving an output signal of the register and an interruption request level signal showing the priority of the interruption request to make a comparison of the priority therebetween, while the DMA transfer control means is a sequencer for deciding the status on the basis of the output signal of the comparator, the sequencer may stop DMA transfer, so to return the DMA unit to the initial state when the priority of the interruption request occurring during the DMA transfer is higher than the priority of the DMA unit, suspend DMA transfer when the priority of the interruption request occurring during the DMA transfer is equal to the priority of the DMA unit and then resuming the DMA transfer after completion of the interruption processing by the interruption request, continue DMA transfer when the priority of the interruption request occurring during the DMA transfer is lower than the priority of the DMA unit, and stop DMA transfer, so to return the DMA unit to the initial state upon receipt of an asynchronous input signal of ICE chip interruption request from external during the DMA transfer.

Also, the DMA unit further may comprise a priority encoder for deciding the priority for DMA transfers to be executed and controlling the DMA transfer control device according to the above-mentioned priority when receiving a plurality of DMA transfer requests.

The DMA unit further may comprise a priority encoder for deciding the priority for DMA transfers to be executed and controlling the DMA transfer control device according to the above-mentioned priority when receiving a plurality of DMA transfer requests, the priority comparison means may include a register for setting the priority of the DMA unit, and a comparator for receiving an output signal of the register and an interruption request level signal showing the priority of the interruption request to make a comparison of the priority therebetween, and the DMA transfer control means is a sequencer for deciding the status on the basis of the output signal of the comparator.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
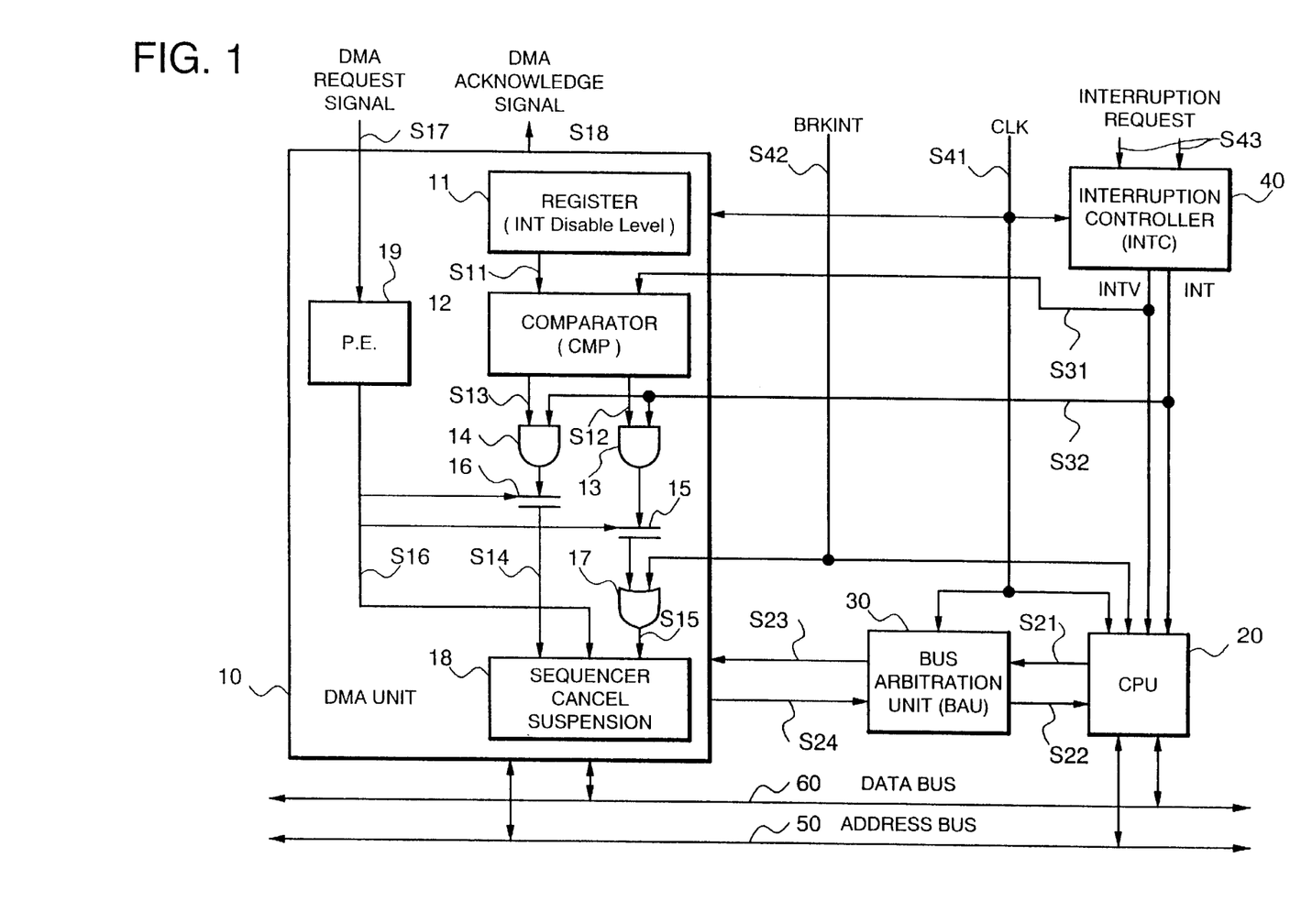
FIG. 1 is a block diagram showing the constitution of a data processing device according to an embodiment of the present invention.

FIG. 1 is a block diagram showing the constitution of a data processing device according to an embodiment of the present invention.

As illustrated in FIG. 1, the data processing device of this embodiment comprises a DMA unit 10, a CPU 20, a bus arbitration unit (BAU) 30, and an interruption controller (INTC) 40. The DMA unit 10 is connected to an external extended device as well as to an address bus 50 and a data bus 60. The CPU 20 is also connected to the address bus 50 and the data bus 60. The DMA unit 10 and the CPU 20 use the bus 50 and the bus 60 monopolistically according to the control of the bus arbitration unit 30. Interruption request signals (INT) and interruption request level signals (INTV) are supplied to the DMA unit 10 and the CPU 20 from the interruption controller 40. Further, clock signals S41 are supplied to the DMA unit 10, the CPU 20, the bus arbitration unit 30, and the interruption controller 40.

In the above-mentioned components, the DMA unit 10 controls the DMA transfer while taking the priority of the processing to be executed into consideration. Namely, the DMA unit 10 continues, interrupts, and cancels the DMA transfer according to a predetermined condition, while making a comparison between the priority of an interruption request occurring during the DMA transfer and the priority put on the DMA unit 10 (itself), in addition to the execution of the DMA transfer according to the DMA request from the external extended device. Cancellation of the DMA transfer means to return the sequencer for DMA transfer control into the reset state after the transition to the interruption processing and abandon the right of using bus. Interruption of the DMA transfer means to abandon the bus-using right temporarily to pass it to the CPU, without returning the sequencer into the initial state even after making the transition to the interruption processing, and obtain the bus-using right again after completion of the processing of the CPU, so to resume the DMA transfer. This embodiment will be described on condition that the DMA transfer is canceled when the priority of an interruption request (interruption level) is higher than the priority of the DMA unit 10 and that the DMA transfer is interrupted when the priority of an interruption request is equal to the priority of the DMA unit 10.

As illustrated, the DMA unit 10 includes a register (INT Disable Level) 11, a comparator (CMP) 12, AND circuits 13 and 14, selectors 15 and 16, OR circuit 17, a sequencer 18, and a priority encoder (P.E.) 19. The output of the register 11 is supplied to the comparator 12. The comparator 12 receives the output S11 of the register 11 and the interruption request level signal S31 sent from the interruption controller 40 and supplies the output signal S12 to the AND circuit 13 and the output signal S13 to the AND circuit 14. The AND circuit 13 receives the output signal S12 of the comparator 12 and the interruption request signal S32 sent from the interruption controller 40, and supplies the output signal to the selector 15. The AND circuit 14 receives the output signal S13 of the comparator 12 and the interruption request signal S32 and supplies the output signal to the selector 16. The selector 15 receives the output signal of the AND circuit 13 and supplies the output signal to the OR circuit 17. The selector 16 receives the output signal of the AND circuit 14 and supplies the output signal to the sequencer 18. The OR circuit 17 receives the output signal of the selector 15 and the BRKINT signal S42 that is an asynchronous input signal of the interruption request for ICE chip and supplies the output signal S15 to the sequencer 18. The sequencer 18 receives the output signals of the selector 16, the OR circuit 17, and the priority encoder 19. The priority encoder 19 receives the DMA request signal S17 from the external extended device and supplies the output signal S16 to the selectors 15 and 16 and the sequencer 18. The DMA unit 10 supplies the DMA acknowledge signal S18 to the extended device in response to the DMA request signal S17 accepted from the external extended device.

The register 11 sets the priority of the DMA unit 10. The value for the priority can be set in the software arbitrarily.

The comparator 12 makes a comparison between the priority set in the register 11 and the interruption level of the interruption request level signal S31 supplied from the interruption controller 40. When the priority of the interruption request level signal S31 is higher than the priority set in the register 11, the comparator 12 supplies the output signal S12 that is "1 (high level)", and when the priority of the interruption request level signal S31 is equal to the priority set in the register 11, it supplies the output signal S13 that is "1 (high level)".

The sequencer 18 decides the operation state of the DMA unit 10 according to a DMA request or an interruption request from an external device. In this embodiment, the status of the sequencer 18 is defined as follows: "T0" is regarded as the initial state, "T1" is regarded as under the DMA transfer, and "T2" is regarded as under suspension of the DMA transfer. The DMA unit 10 sets the bus hold request signal S24 for the bus arbitration unit 30 as "1 (high level)" when the status of the sequencer 18 is "T1", and sets the bus hold request signal S24 for the bus arbitration unit 30 as "0 (low level)" when the status of the sequencer 18 is "T0" and "T2". If the output signal S15 of the OR circuit 17 becomes "1 (high level)", the status of the sequencer 18 shifts to the initial state "T0" and cancels the DMA transfer. If the output of the selector 16 becomes "1 (high level)", the status of the sequencer 18 shifts to the suspended state "T2" and suspends the DMA transfer.

When a plurality of DMA request signals S17 are received from a plurality of extended devices, the priority encoder 19 decides which request for the DMA transfer to be executed from the received DMA request signals S17.

The selectors 15 and 16 are controlled by the output signal S16 of the priority encoder 19 and always selected alternatively.

The bus arbitration unit 30 is a control device for giving the using right of the address bus 50 and the data bus 60 to the DMA unit 10 or the CPU 20, intervening therebetween. At the starting of the data processing device, or just after reset of the data processing device, the CPU 20 issues the bus hold request S21 to the bus arbitration unit 30, and the bus arbitration unit 30 issues the acknowledge signal S22 in response to the bus hold request, to the CPU 20. Thus, the using right of the address bus 50 and the data bus 60 is possessed by the CPU 20. At the operating time of the DMA unit 10, the DMA unit 10 issues the bus hold request S23 to the bus arbitration unit 30, the bus arbitration unit 30 arbitrates between the DMA unit 10 and the CPU 20 as for the bus, and issues the acknowledge signal 524 in response to the bus hold request, to the DMA unit 10 at the point of the CPU 20 parting with the bus hold. Thus, the DMA unit 10 starts operation.

The interruption controller 40 is a control device for receiving a plurality of interruption requests and selecting the interruption request having the highest priority from the requests, to send the interruption request level signal (INTV) S31 and the interruption request signal (INT) S32 to the CPU 20. The interruption request level signal S31 and the interruption request signal S32 are also sent to the DMA unit 10 as mentioned above.

The BRKINT signal S42 is an asynchronous input signal for the ICE chip interruption request from external. This signal S42 makes the sequencer 18 of the DMA unit 10 the initial state "T0" and the instruction in the BRKINT handler address of the CPU 20 is executed.

This time, the operation of the embodiment in the case where an interruption request occurred during the DMA transfer will be described with reference to the time charts of FIGS. 2 through 5.

In the following operation, the priority of the DMA unit 10 set in the register 11 is regarded as "m" and the interruption level (priority) of the interruption request level signal (INTV) S31 is regarded as "n". Assume that both the priority "m" and "n" can be set at any level of 16 stages.

First of all, the description will be made in case of stopping the DMA transfer. In the embodiment, the DMA transfer is stopped by the occurrence of an interruption request, or it is stopped by turning the BRKINT signal to "1".

In case of the DMA transfer stopping process by an interruption request, the value of the priority "m" set in the register 11 and the interruption level "n" of the interruption request level signal S31 must be set as m<n. They are defined as m=3, n=7, by way of example.

Figure 2:
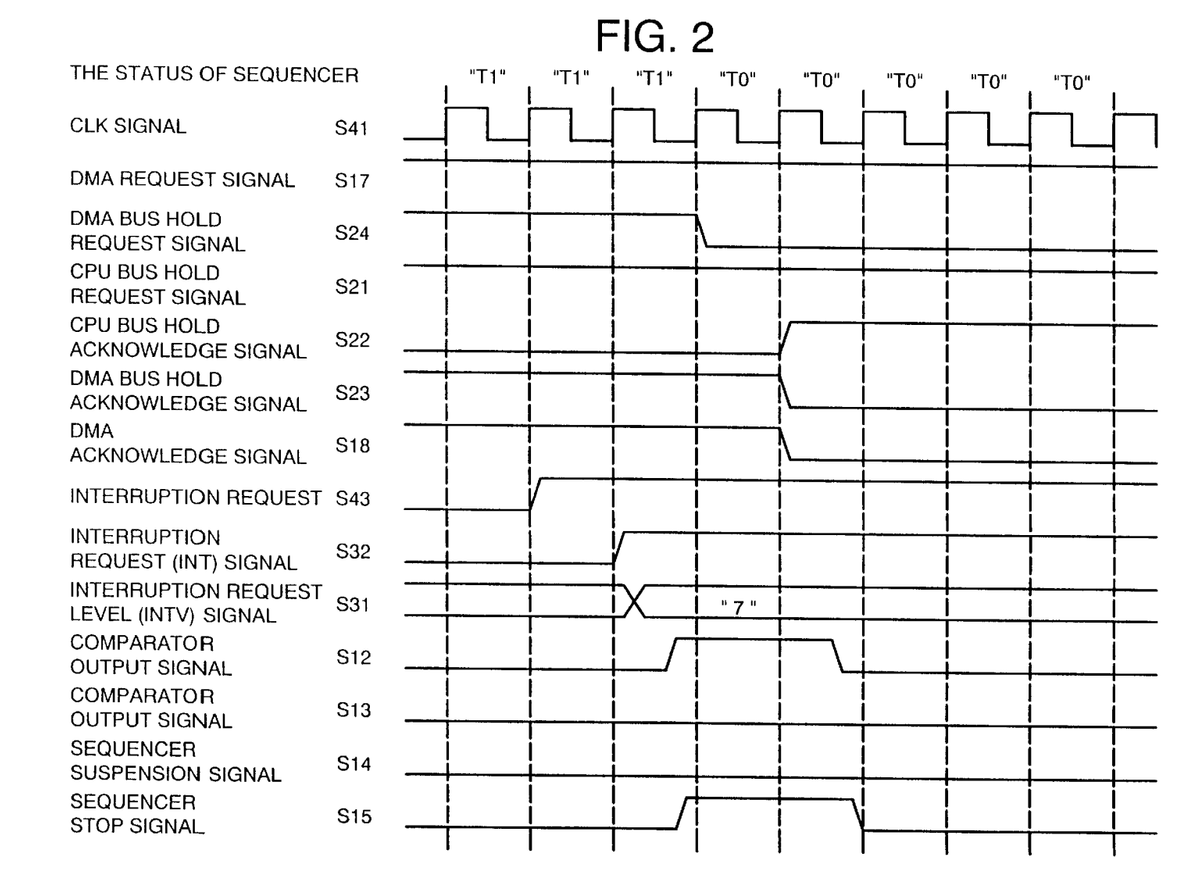
FIG. 2 is a time chart showing the operation of the embodiment, as well as a view showing the operation when an interruption instruction having higher priority than the DMA unit occurs.

With reference to FIG. 2, if the interruption request S43 of interruption level "7" occurs during the DMA transfer, in other words, when the DMA bus hold request signal S24 is "1" and the DMA acknowledge signal S18 is "1", the interruption controller 40 turns the interruption request signal (INT) S32 for the CPU 20 to "1" depending on the interruption signal level, and supplies the signal of the interruption level "n=7" as the interruption request level signal (INTV) S31. Thus, the CPU 20 is requested to execute the interruption processing.

The comparator 12 makes a comparison between the interruption level "n=7" of the interruption request level signal (INTV) S31 and the value of the priority "m=3" set in the register 11. In this case, since n=7, 3<7, the output signal S12 of the comparator 12 turns to "1" and the output of the AND circuit 13 turns to "1". Since the BRKINT signal S42 remains "0", the output S15 of the OR circuit 17 turns to "1". Thus, the sequencer 18 returns from "T1" to the initial state "T0".

The DMA unit 10 turns the bus hold request signal S24 for the bus arbitration unit 30 to "0". In response to this, the bus arbitrary unit 30 turns the bus hold acknowledge signal S23 for the DMA unit 10 to "0" and the bus hold acknowledge signal S21 for the CPU 20 to "1". Thus, the DMA unit 10 returns the bus-using right to the CPU 20. Upon acquisition of the bus-using right, the CPU 20 starts the operation to execute the processing based on the interruption request. Above is the operation in case of stopping the DMA transfer by an interruption request.

Figure 5:
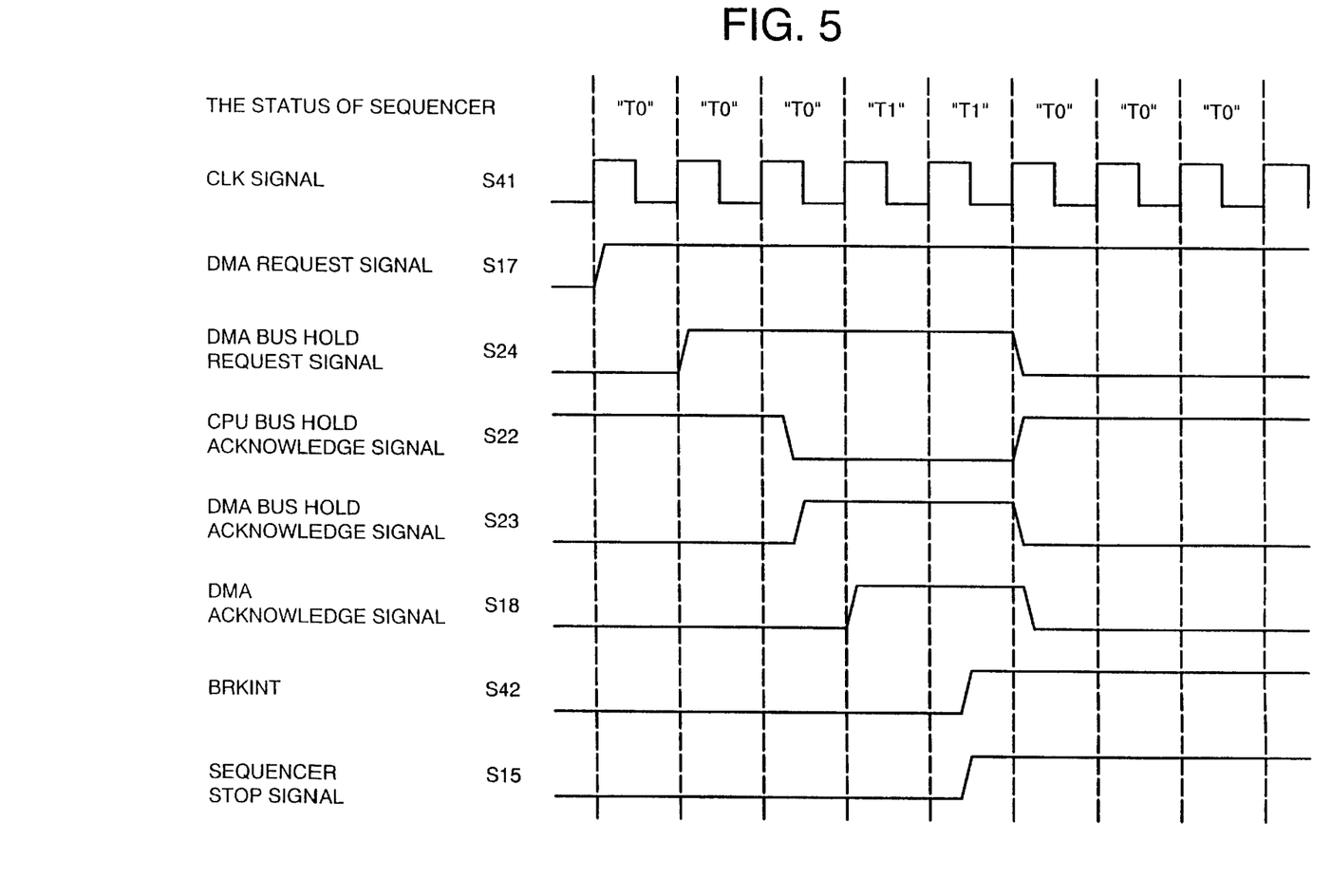
FIG. 5 is a time chart showing the operation of the embodiment, as well as a view showing the operation when the BRKINT signal for ICE mode transition occurs.

Next, the description will be made in case of stopping the DMA transfer by the BRKINT signal S42.

With reference to FIG. 5, if turning the BRKINT signal S42 to "1", the output signal S15 of the OR circuit 17 turns to "1". As a result, the sequencer 18 returns from "T1" to the initial state "T0", where the DMA transfer is stopped and the bus-using right is returned to the CPU 20 similarly to the above-mentioned operation. Above is the operation in case of stopping the DMA transfer by the BRKINT signal.

This time, the description will be made in the case where the priority m of the DMA unit 10 is not less than the interruption level n of the interruption request, m≧n. When m≧n, the DMA transfer is not stopped. Hereinafter, the description will be made separately in case of m=n and in case of m>n. First, the description is made in case of m=n. Assume that m=5 and n=5 by way of example.

Figure 3:
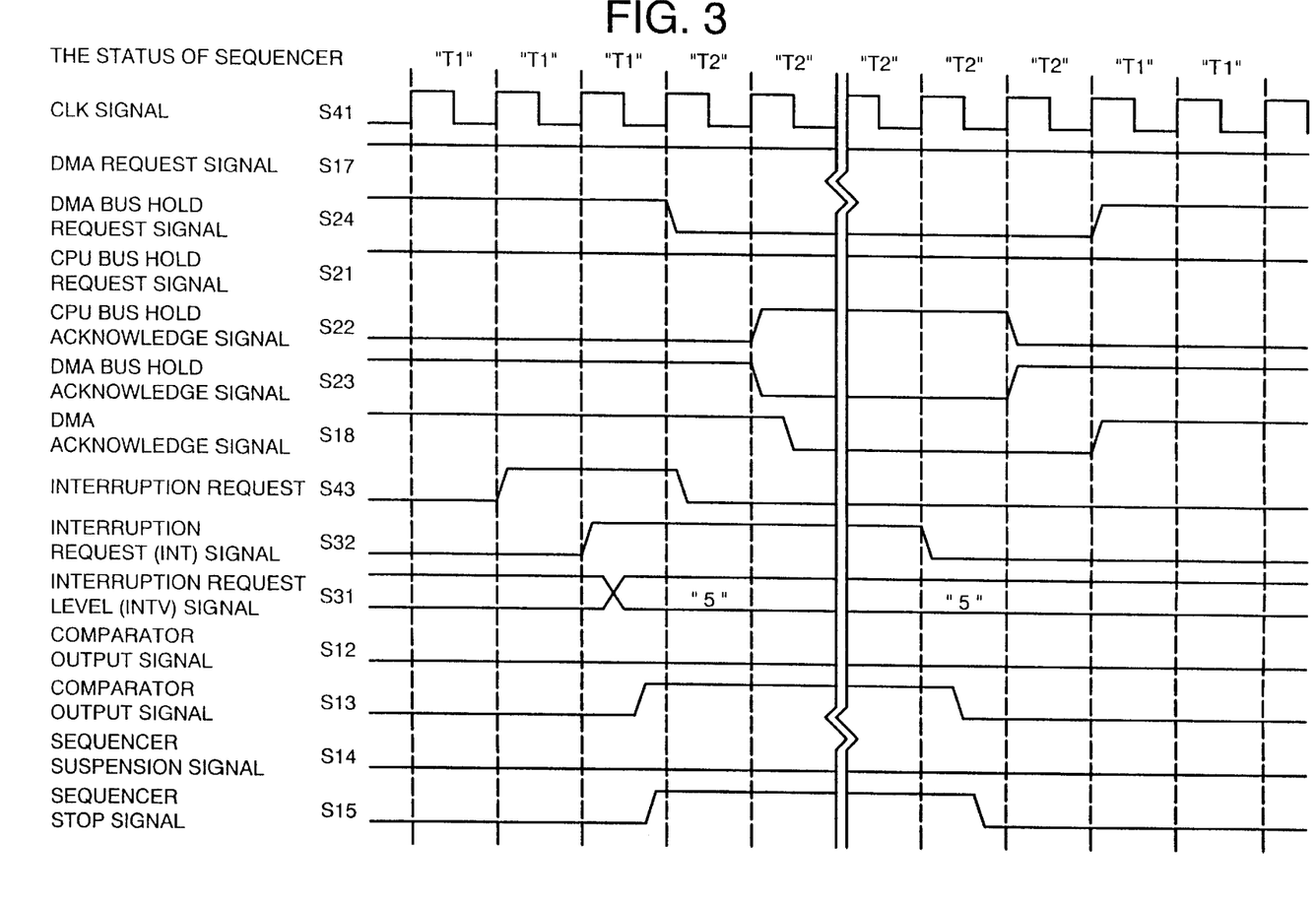
FIG. 3 is a time chart showing the operation of the embodiment, as well as a view showing the operation when an interruption instruction having the same priority as the DMA unit occurs.

With reference to FIG. 3, the interruption controller 40, upon receipt of the interruption request S43, turns the interruption request signal (INT) S32 for the CPU 20 to "1", and supplies the interruption level 5 as the interruption request level signal (INTV) S31. The comparator 12 of the DMA unit 10 makes a comparison between the interruption level "n=5" of the interruption request level signal (INTV) S31 and the value of the priority m=5 set in the register 11. Since "m=n", the output signal S13 of the comparator 12 turns to "1" and the output of the AND circuit 14 turns to "1". As a result, the sequencer 18 turns to the DMA transfer suspended state "T2".

The bus arbitration unit 30 turns the bus hold acknowledge signal S23 for the DMA unit 10 to "0" and the bus hold acknowledge signal S22 for the CPU 20 to "1". This suspends the DMA transfer and the CPU 20 executes the processing based on the interruption request.

Upon completion of the interruption, the bus arbitration unit 30 turns the bus hold acknowledge signal S22 for the CPU 20 to "0" and the bus hold acknowledge signal 20 for the DMA unit 10 to "1". As a result, the sequencer 18 returns to the DMA transfer state "T1" and the DMA transfer resumes.

Figure 4:
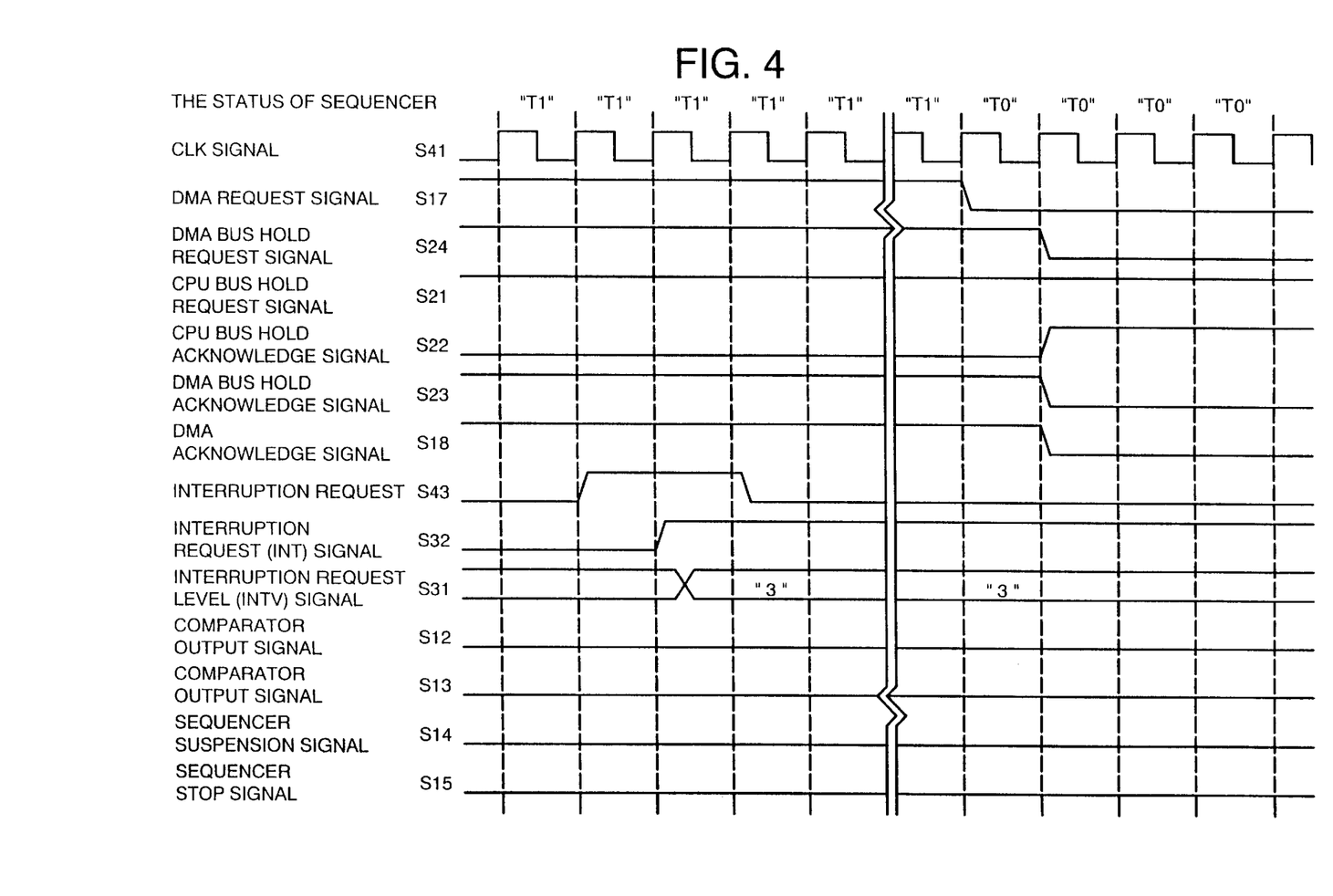
FIG. 4 is a time chart showing the operation of the embodiment, as well as a view showing the operation when an interruption instruction having lower priority than the DMA unit occurs.

Next, the description will be made in the case where the priority m of the DMA unit 10 is larger than the interruption level n of the interruption request, m>n, for example, m=7 and n=3.

With reference to FIG. 4, even if an interruption request occurs from external during the operation of the DMA unit 10, the DMA transfer continues because the priority of the DMA unit 10 is higher. After completion of the DMA transfer, interruption processing is executed from the highest priority request of the queues in order. After completion of all interruption processing and DMA processing, the CPU returns to the normal mode and executes ordinary processing.

As mentioned above, the present embodiment is capable of stopping the DMA transfer according to the control of the hardware, i.e. by the interruption request signal, and saving a program for stopping the DMA transfer, thereby shortening the execution time of the interruption processing.

In case of a plurality of DMA transfer channels, the above operation is done for each channel under service.

Although the present invention has been described by the use of the preferred embodiment, the present invention is not necessarily restricted to the above embodiment.

As set forth hereinabove, at first, according to the present invention, since the DMA transfer is stopped according to the control of the hardware when the higher-priority request occurs, it is not necessary to write a program for stopping the DMA transfer in the interruption processing, thereby shortening the time spent in the processing for stopping the DMA transfer effectively. Therefore, it is possible to shorten the execution time in the various processing such as simulation, LSI test, or the like, by the use of the data processing device of the present invention.

Secondary, it is possible to save a program for stopping the DMA transfer in the interruption processing, thereby decreasing the size of the control program for controlling various processing such as simulation, LSI test, or the like by the use of the data processing device of the present invention.

Thirdly, it is possible to stop the DMA transfer by the BRKINT signal for ICE mode transition, thereby shortening the transition time toward the ICE mode under the DMA transfer.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data processing device having a DMA function for controlling DMA transfer, comprising:

a DMA unit, a CPU, a bus arbitration unit for controlling a bus-using right of at least one of said DMA unit and said CPU; and an interruption controller for supplying an interruption request signal, said DMA unit comprising:

priority comparison means for making a comparison between a priority of a DMA transfer set on said DMA unit and a priority of an interruption request; and a DMA transfer control means for deciding whether the DMA transfer is to be executed, canceled, or suspended in an operation state of the DMA unit according to a comparison result of said priority comparison means, said DMA transfer control means including:

(a) a logic circuit which generates at least one of a DMA transfer cancel signal and a DMA transfer suspend signal based on said comparison result; and (b) a sequencer circuit which cancels or suspends the DMA transfer in response to said DMA transfer cancel signal or DMA transfer suspend signal, respectively, output from said logic circuit.

2. A data processing device having a DMA function as set forth in claim 1, wherein said DMA transfer control means stops DMA transfer, so to return said DMA unit to an initial state when the priority of the interruption request occurring during the DMA transfer is higher than the priority of said DMA unit, suspends DMA transfer when the priority of the interruption request occurring during the DMA transfer is equal to the priority of said DMA unit and resumes the DMA transfer after completion of the interruption processing by the interruption request, and continues DMA transfer when the priority of the interruption request occurring during the DMA transfer is lower than the priority of said DMA unit.

3. A data processing device having a DMA function as set forth in claim 1, wherein said DMA transfer control means, upon receipt of an asynchronous input signal of ICE chip interruption request during DMA transfer, stops the DMA transfer, so to return said DMA unit to the initial state.

4. A data processing device having a DMA function as set forth in claim 1, wherein said DMA transfer control means stops DMA transfer, so to return said DMA unit to an initial state when the priority of the interruption request occurring during the DMA transfer is higher than the priority of said DMA unit, suspends DMA transfer when the priority of the interruption request occurring during the DMA transfer is equal to the priority of said DMA unit and resumes the DMA transfer after completion of the interruption processing by the interruption request, continues DMA transfer when the priority of the interruption request occurring during the DMA transfer is lower than the priority of said DMA unit, and upon receipt of an asynchronous input signal of ICE chip interruption request during DMA transfer, stops the DMA transfer, so to return said DMA unit to the initial state.

5. A data processing device having a DMA function as set forth in claim 1, wherein:

said priority comparison means includes a register for setting the priority of the DMA transfer set on said DMA unit, and a comparator for receiving an output signal of said register indicative of the priority of the DMA transfer and an interruption request level signal showing the priority of the interruption request, said comparator comparing said output signal and said interuption request level signal, and said sequencer cancels or suspends the DMA transfer on a basis of an output signal of said comparator.

6. A data processing device having a DMA function as set forth in claim 1, wherein:

said priority comparison means includes a register for setting the priority of the DMA transfer set on said DMA unit, and a comparator for receiving an output signal of said register indicative of the priority of the DMA transfer and an interruption request level signal showing the priority of the interruption request, said comparator comparing said output signal and said interruption request level signal, said sequencer cancels or suspends the transfer on a basis of an output signal of said comparator, said sequencer stopping the DMA transfer, so to return said DMA unit to an initial state when the priority of the interruption request occurring during the DMA transfer is higher than the priority of said DMA unit, suspending the DMA transfer when the priority of the interruption request occurring during the DMA transfer is equal to the priority of said DMA unit and then resuming the DMA transfer after completion of the interruption processing by the interruption request, and continuing the DMA transfer when the priority of the interruption request occurring during the DMA transfer is lower than the priority of said DMA unit.

7. A data processing device having a DMA function as set forth in claim 1, wherein:

said priority comparison means includes a register for setting the priority of the DMA transfer set on said DMA unit, and a comparator for receiving an output signal of said register indicative of the priority of the DMA transfer and an interruption request level signal showing the priority of the interruption request, said comparator comparing said output signal and said interruption request level signal, and said sequencer cancels or suspends the transfer on a basis of an output signal of said comparator, said sequencer stopping the DMA transfer so to return said DMA unit to an initial state upon receipt of an asynchronous input signal of ICE chip interruption request during the DMA transfer.

8. A data processing device having a DMA function as set forth in claim 1, in which:

said priority comparison means includes a register for setting the priority of the DMA transfer set on said DMA unit, and a comparator for receiving an output signal of said register indicative of the priority of the DMA transfer and an interruption request level signal showing the priority of the interruption request, said comparator comparing said output signal and said interruption request level signal, said sequencer cancels or suspends the transfer on a basis of an output signal of said comparator, said sequencer stopping the DMA transfer, so to return said DMA unit to an initial state when the priority of the interruption request occurring during the DMA transfer is higher than the priority of said DMA unit, suspending the DMA transfer when the priority of the interruption request occurring during the DMA transfer is equal to the priority of said DMA unit and then resuming the DMA transfer after completion of he interruption processing by the interruption request, and continuing the DMA transfer when the priority of the interruption request occurring during the DMA transfer is lower than the priority of said DMA unit, and stopping the DMA transfer, so to return said DMA unit to the initial state upon receipt of an asynchronous input signal of ICE chip interruption request during the DMA transfer.

9. A data processing device having a DMA function as set forth in claim 1, wherein said DMA unit further comprises:

a priority encoder which decides priority for DMA transfers to be executed and which controls the DMA transfer control means according to the priority for said DMA transfers when receiving a plurality of DMA transfer requests, said priority encoder inputting a control signal into said logic circuit for causing said logic circuit to output one of said DMA transfer cancel signal and said DMA transfer suspend signal to said sequencer circuit.

10. A data processing device having a DMA function as set forth in claim 1, wherein said DMA unit further comprises:

a priority encoder which decides priority for DMA transfers to be executed and which controls the DMA transfer control means according to the priority for said DMA transfers when receiving a plurality of DMA transfer requests, said priority encoder inputting a control signal into said logic circuit for causing said logic circuit to output one of said DMA transfer cancel signal and said DMA transfer suspend signal to said sequencer circuit, and wherein said priority comparison means includes a register for setting the priority of said DMA unit, and a comparator for receiving an output signal of said register and an interruption request level signal showing the priority of the interruption request to make a comparison of the priority therebetween, and said sequencer cancels or suspends a DMA transfer on a basis of an output signal of said comparator.

11. A data processing device having a DMA function as set forth in claim 1, wherein said DMA unit further includes a priority encoder circuit for selecting which of said DMA transfer cancel signal and DMA transfer suspend signal is input into said sequencer circuit.

12. A data processing device having a DMA function as set forth in claim 4, wherein the asynchronous signal of ICE chip interruption request is an external signal.

13. A data processing device having a DMA function as set forth in claim 7, wherein the asynchronous signal of ICE chip interruption request is an external signal.

14. A data processing device having a DMA function as set forth in claim 8, wherein the asynchronous signal of ICE chip interruption request is an external signal.

15. A data processing device comprising:

a DMA unit;

a CPU;

a bus arbitration unit for controlling a bus-using right of the DMA unit or the CPU; and an interruption controller for supplying an interruption request signal to the DMA unit, said DMA unit including:

a comparison circuit which compares a priority of a DMA transfer and a priority of an interruption request received by said interruption controller, and a DMA transfer control device which decides whether the DMA transfer is to be executed, canceled, or suspended based on a comparison result of said comparison circuit and a logical value of said interruption request signal.

16. A data processing device as set forth in claim 15, wherein said DMA transfer control device includes a sequencer which decides a status of said DMA unit based on an output signal of said comparison circuit, said sequencer:

(a) stopping the DMA transfer and returning said DMA unit to an initial state when the priority of the interruption request occurring during the DMA transfer is higher than the priority of the DMA transfer, (b) suspending the DMA transfer when the priority of the interruption request occurring during the DMA transfer is equal to the priority of the DMA transfer and then resuming the DMA transfer after completion of the interruption processing by the interruption request, and (c) continuing the DMA transfer when the priority of the interruption request occurring during the DMA transfer is lower than the priority of the DMA transfer.

* * * * *